United States Patent
Lee et al.

(10) Patent No.: US 11,068,877 B2
(45) Date of Patent: Jul. 20, 2021

(54) METHOD AND DEVICE FOR DISPLAYING INDICATION OF PAYMENT

(71) Applicant: Samsung Electronics Co., Ltd., Suwon-si (KR)

(72) Inventors: Jeonghwa Lee, Seoul (KR); Kyungduk Kim, Seoul (KR); Seungdoo Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 16/070,118

(22) PCT Filed: Jan. 16, 2017

(86) PCT No.: PCT/KR2017/000512
§ 371 (c)(1),
(2) Date: Jul. 13, 2018

(87) PCT Pub. No.: WO2017/123069
PCT Pub. Date: Jul. 20, 2017

(65) Prior Publication Data
US 2019/0066085 A1 Feb. 28, 2019

(30) Foreign Application Priority Data
Jan. 15, 2016 (KR) .................. 10-2016-0005204

(51) Int. Cl.
*G06Q 30/00* (2012.01)
*G06Q 20/32* (2012.01)
(Continued)

(52) U.S. Cl.
CPC ........... *G06Q 20/327* (2013.01); *G06Q 20/16* (2013.01); *G06Q 20/34* (2013.01); *G06Q 20/38* (2013.01);
(Continued)

(58) Field of Classification Search
CPC ............. G06Q 20/327; G06Q 30/0207; G06Q 30/0215; G06Q 20/34; G06Q 20/40145;
(Continued)

(56) References Cited

U.S. PATENT DOCUMENTS

2009/0222349 A1* 9/2009 Burger ................. G06Q 20/341
705/14.38
2012/0316992 A1* 12/2012 Oborne .............. G06Q 20/3223
705/26.41
(Continued)

FOREIGN PATENT DOCUMENTS

| CN | 105094893 A | 11/2015 |
|---|---|---|
| CN | 105190659 A | 12/2015 |

(Continued)

OTHER PUBLICATIONS

European Search Report dated Nov. 9, 2018, issued in European Application No. 17738698.4-1217 / 3388993.
(Continued)

*Primary Examiner* — Sun M Li
(74) *Attorney, Agent, or Firm* — Jefferson IP Law, LLP

(57) ABSTRACT

An electronic device comprises a display, a memory, and a processor, wherein the processor may be configured to: display, via the display, an indication which is stored in the memory and corresponds to a payment means; confirm circumstantial information on the electronic device; if the circumstantial information satisfies a first designated condition, display first additional information on the payment means in association with the indication via the display; and if the circumstantial information satisfies a second designated condition, display second additional information on the payment means in association with the indication via the display. Other embodiments are also available.

12 Claims, 13 Drawing Sheets

(51) Int. Cl.
    *G06Q 20/34*     (2012.01)
    *G06Q 20/38*     (2012.01)
    *G06Q 30/02*     (2012.01)
    *G06Q 20/40*     (2012.01)
    *G06Q 20/16*     (2012.01)

(52) U.S. Cl.
    CPC ............ *G06Q 20/40* (2013.01); *G06Q 30/02* (2013.01); *G06Q 30/0207* (2013.01); *G06Q 30/0215* (2013.01); *G06Q 20/32* (2013.01); *G06Q 20/40145* (2013.01)

(58) Field of Classification Search
    CPC ........ G06Q 20/32; G06Q 20/16; G06Q 20/38; G06Q 20/40; G06Q 30/02
    See application file for complete search history.

(56) References Cited

U.S. PATENT DOCUMENTS

| | | | | |
|---|---|---|---|---|
| 2014/0115125 A1* | 4/2014 | Chen | ........................ | H04L 67/26 709/219 |
| 2014/0207669 A1 | 7/2014 | Rosenberg | | |
| 2014/0372193 A1* | 12/2014 | Jorgensen | .......... | G06Q 30/0226 705/14.23 |
| 2015/0227922 A1 | 8/2015 | Filler | | |
| 2017/0131884 A1* | 5/2017 | Jeon | ....................... | G06F 3/0481 |

FOREIGN PATENT DOCUMENTS

| | | |
|---|---|---|
| KR | 2004-0024662 A | 3/2004 |
| KR | 2008-0026935 A | 3/2008 |
| KR | 2009-0000643 A | 1/2009 |
| KR | 2009-0040081 A | 4/2009 |
| KR | 2011-0134098 A | 12/2011 |
| KR | 2011-0139356 A | 12/2011 |
| KR | 2012-0105596 A | 9/2012 |
| KR | 2015-0019955 A | 2/2015 |
| KR | 2015-0024454 A | 3/2015 |
| KR | 2015-0033044 A | 4/2015 |
| WO | 2014/134180 A2 | 9/2014 |

OTHER PUBLICATIONS

Chinese Office Action with English translation dated May 12, 2021; Chinese Appln. No. 201780006858.0.

* cited by examiner

METHOD AND DEVICE FOR DISPLAYING INDICATION OF PAYMENT

TECHNICAL FIELD

Various embodiments of the present invention relate to a method for displaying an indication of a payment means and to an electronic device using the method.

BACKGROUND ART

A mobile payment service using an electronic device is being introduced. Existing real tools of payment (e.g., a credit card, a debit card, etc.) may be replaced by a mobile payment means based on an electronic device. Meanwhile, a mobile payment manager may previously store certain information (e.g., a card skin) including the same image as an image of a real payment means in a service server. When a user registers a mobile payment means in an electronic device, information corresponding to the mobile payment means may be retrieved from a service server.

DISCLOSURE OF INVENTION

Technical Problem

Information (e.g., a card skin) corresponding to a mobile payment means is a user interface (UI) that can be initially seen when a mobile payment application (e.g., Samsung Pay) is executed. Although such a card skin is capable of offering various kinds of information to a user, the card skin merely offers the same/similar information as/to information (e.g., a payment means name, a payment means image, a payment means number, a subscriber name, etc.) provided by an existing real payment means, thus being limited in its use.

Solution to Problem

According to various embodiments of the present invention, an electronic device may comprise a display; a memory; and a processor, wherein the processor may be configured to: display an indication stored in the memory and corresponding to a payment means through the display; identify context information related to the electronic device; display first additional information related to the payment means in association with the indication through the display when the context information satisfies a first designated condition; and display second additional information related to the payment means in association with the indication through the display when the context information satisfies a second designated condition.

According to various embodiments of the present invention, a method of an electronic device may comprise operations of displaying an indication corresponding to a payment means; identifying context information related to the electronic device; displaying first additional information related to the payment means in association with the indication when the context information satisfies a first designated condition; and displaying second additional information related to the payment means in association with the indication when the context information satisfies a second designated condition.

Advantageous Effects of Invention

According to various embodiments of the present invention, it is possible to variously display an indication (e.g., a card skin, a cover art, an image, etc.) related to a mobile payment means (e.g., Samsung Card 2, Samsung Card 7, etc.) displayed in a mobile payment application (e.g., Samsung Pay). This allows the user to intuitively perceive the mobile payment means and easily identify the benefits of the mobile payment means. In addition, a mobile payment service manager can directly deliver promotion information to a user to increase the marketing effect.

MODE FOR THE INVENTION

Figure 1:
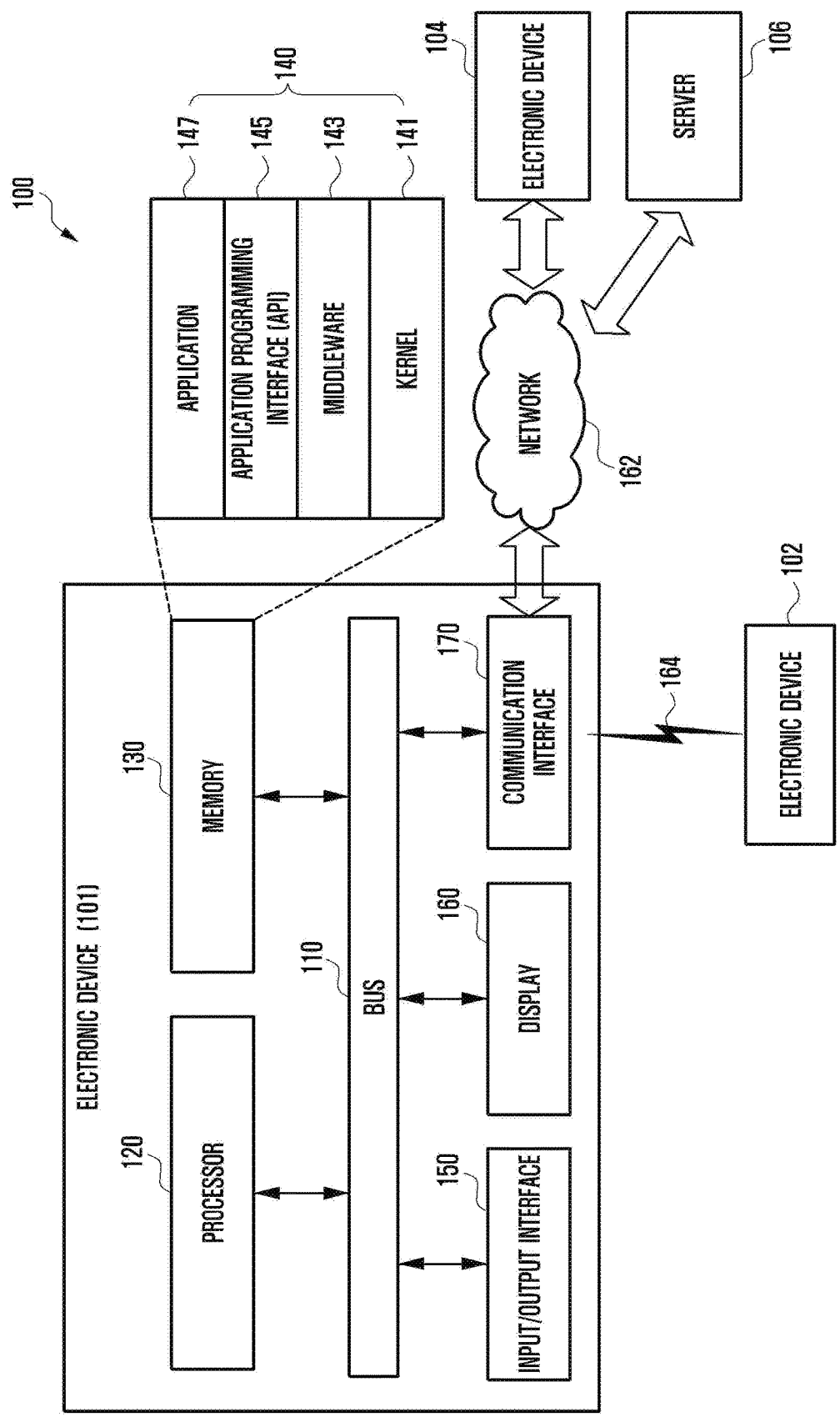
FIG. 1 is a diagram of a network environment including an electronic device according to various embodiments of the present invention.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.).

An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram 100 illustrating an electronic apparatus according to an embodiment of the present disclosure.

Referring to FIG. 1, the electronic apparatus 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 100.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 100 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user. The communication interface 170 can establish a communication between the electronic apparatus 100 and another electronic devices 102 and 104 and/or a server 164.

The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like.

Each of the electronic devices 102 and 104 may be a same type and/or different types of electronic apparatus.

Figure 2:
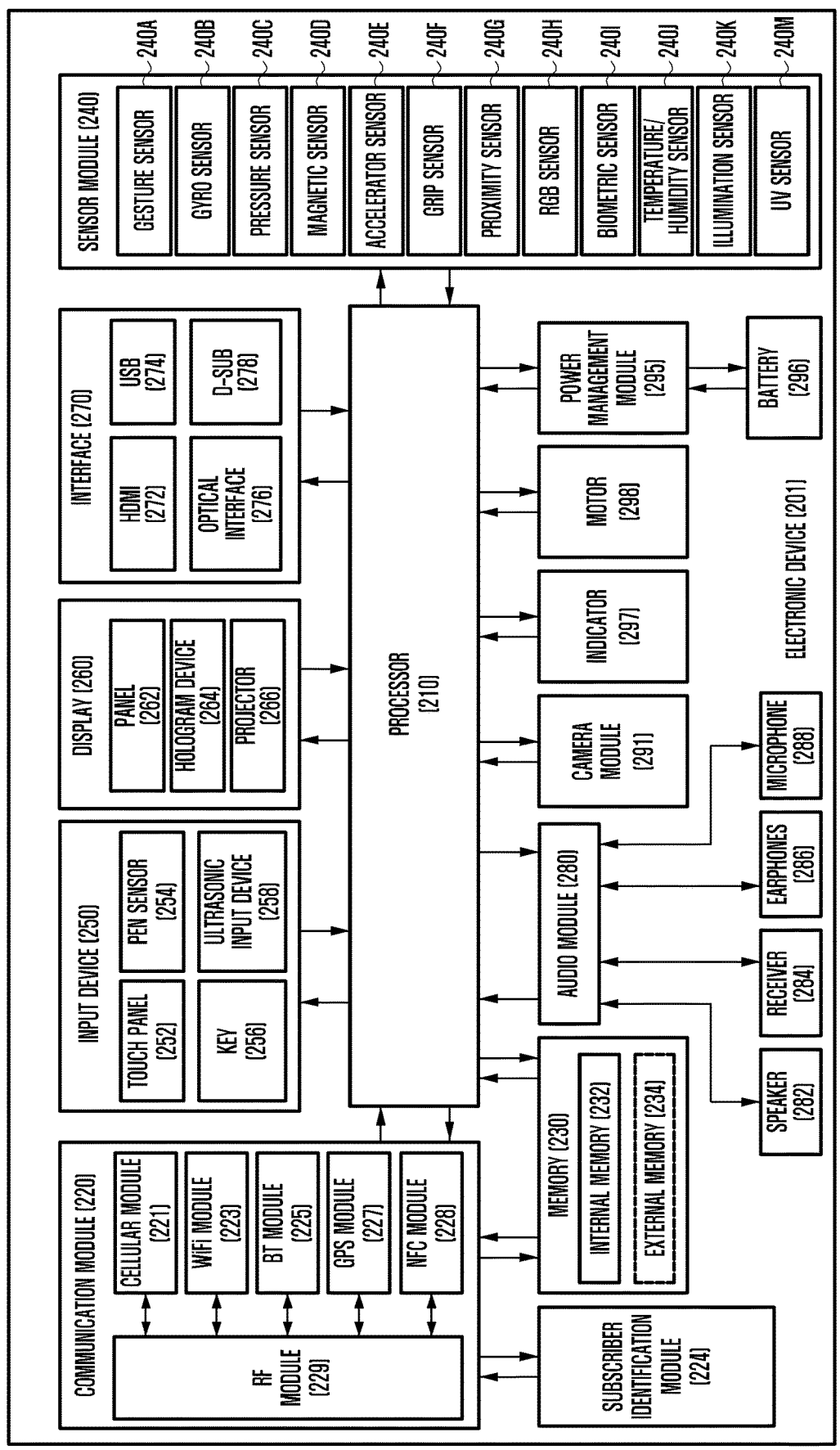
FIG. 2 is a block diagram of an electronic device according to various embodiments of the present invention.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card formed of SIM and may be inserted into a slot 225_1 to 225_N formed at a certain place of the electronic device. The SIM card 224_1 to 224_N may contain therein an ICCID (Integrated Circuit Card IDentifier) or an International Mobile Subscriber Identity (IMSI).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, LCD (Liquid Crystal Display), AMOLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (MultiMedia Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Figure 3:
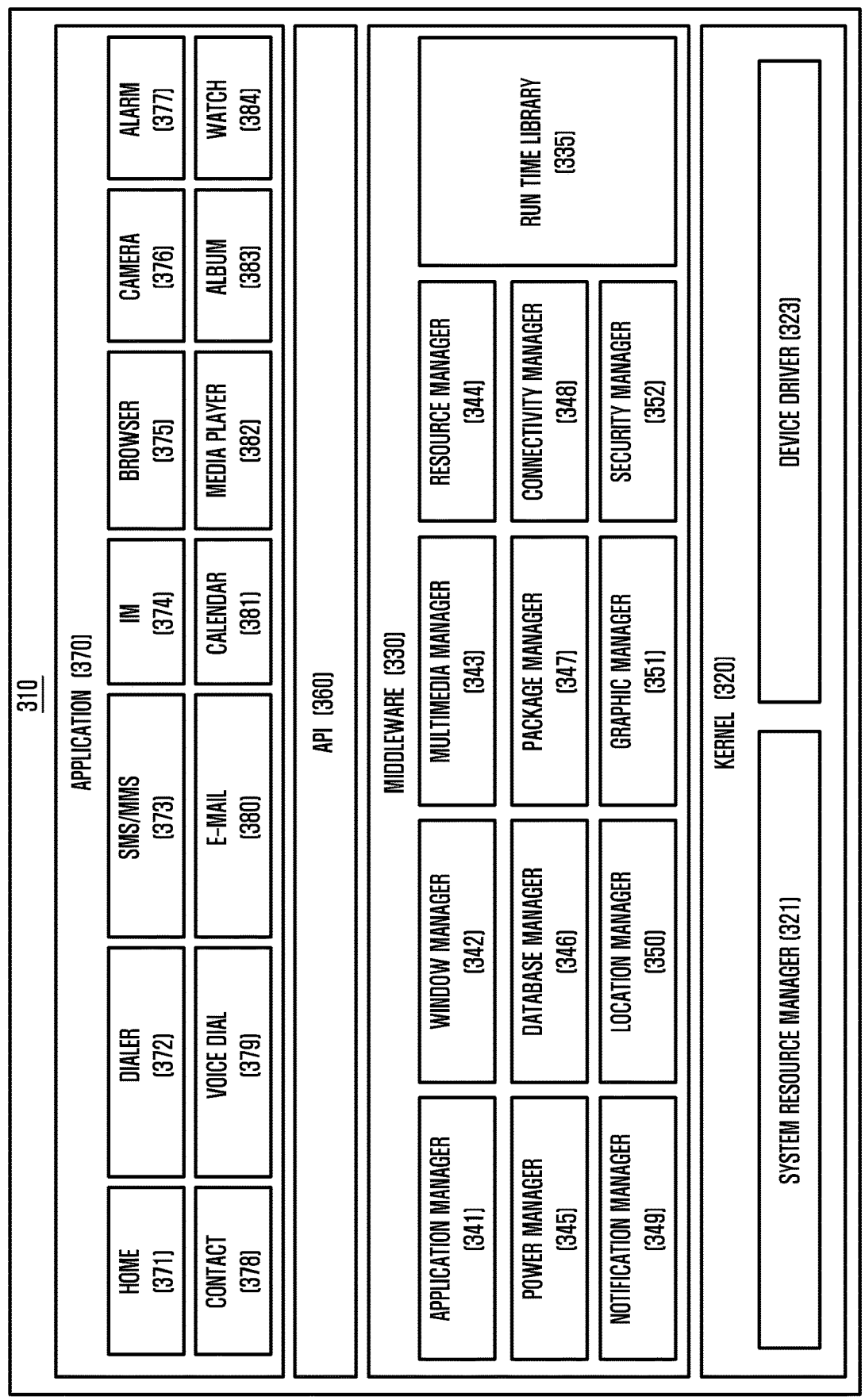
FIG. 3 is a block diagram of a program module according to various embodiments of the present invention.

FIG. 3 is a block diagram illustrating a configuration of a programming module 300 according to an embodiment of the present disclosure.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Figure 4:
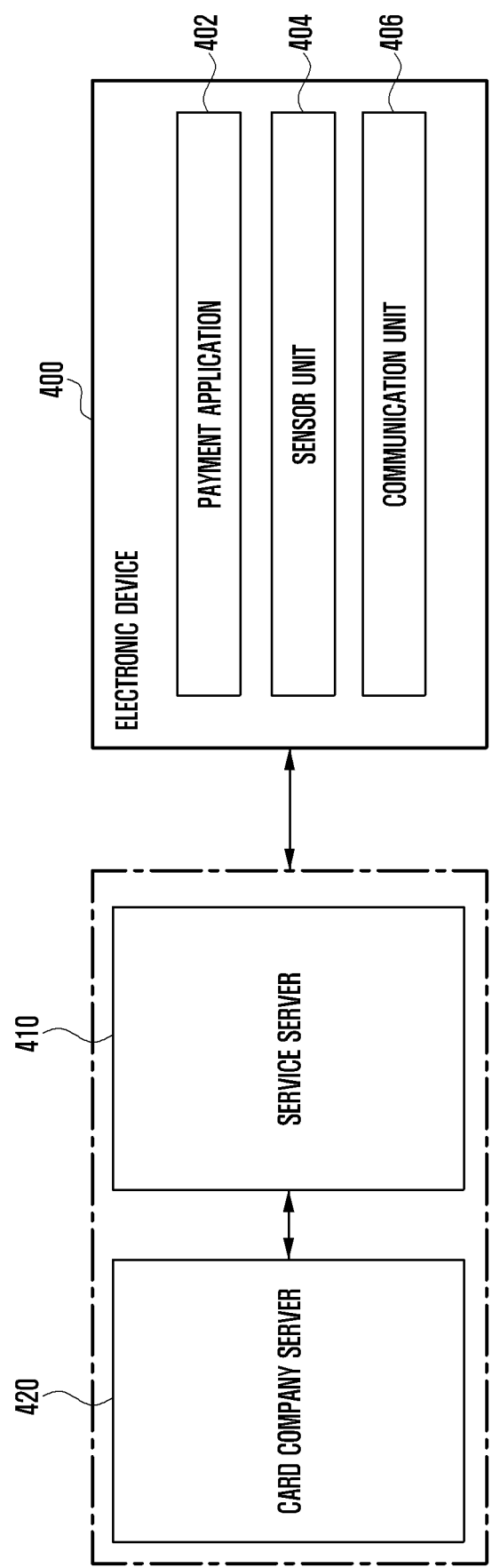
FIG. 4 is a diagram schematically illustrating the configuration of a mobile payment system according to various embodiments of the present invention.

FIG. 4 is a diagram schematically illustrating the configuration of a mobile payment system according to various embodiments of the present invention. An indication disclosed in the present invention may refer to graphic information about a payment means, including, for example, a card image, a card skin, a cover art, and the like.

Referring to FIG. 4, in various embodiments of the present invention, the mobile payment system may include an electronic device 400, a service server 410, and a card company server 420. The card company server 420 may possess information about at least one card operated by a card company. For example, the card company server 420 may provide information including a card name, a card subscriber, a card expiration date, a card number, a benefit of a card, advertisement, and the like. The service server 410 may receive information about a card from the card company server 420 and possess the received information. Meanwhile, in various embodiments of the present invention, the service server 410 may perform the function of the card company server 420, and in this case the mobile payment system may operate through the service server 410.

According to various embodiments of the present invention, the electronic device 400 may include a payment application 402, a sensor unit 404, and a communication unit 406. The electronic device 400 may receive information about at least one card from the service server 410. Herein, a card is used as a word representative of a payment means, and may be replaced with any term that means a payment means. Meanwhile, the electronic device 400 may refer to the electronic device 101 of FIG. 1 or the electronic device 201 of FIG. 2.

Figure 5:
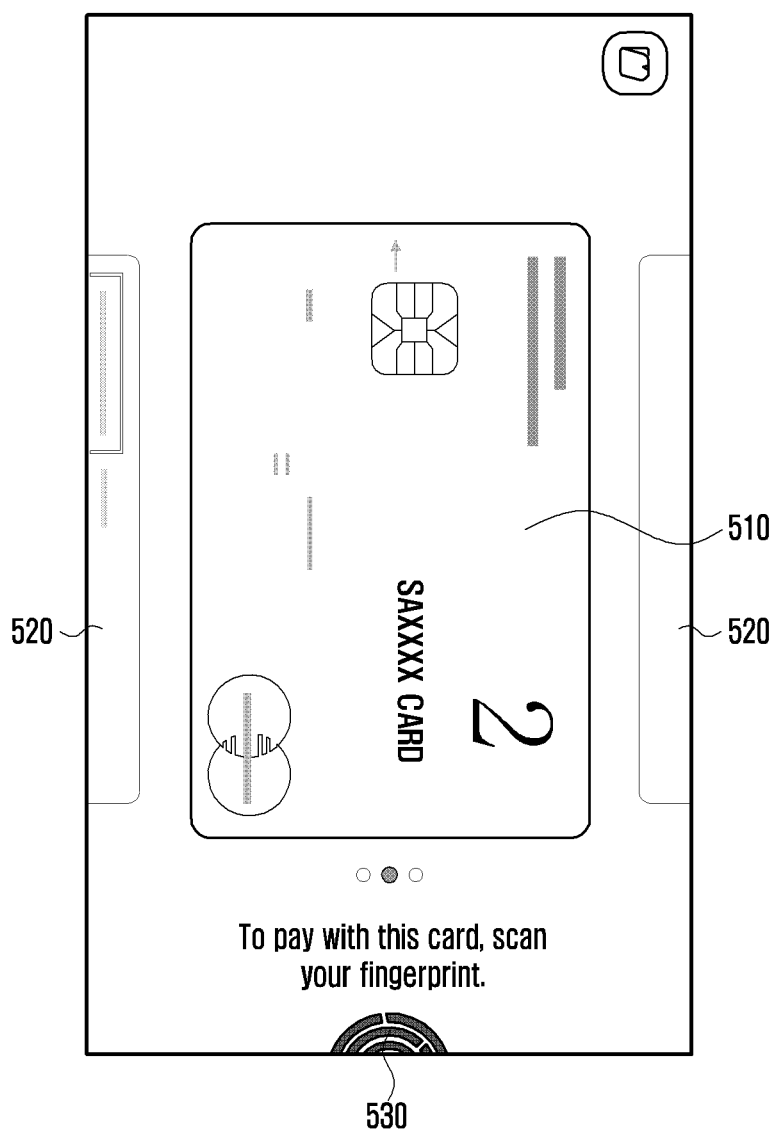
FIG. 5 is a diagram illustrating a user interface for a mobile payment means of an electronic device according to various embodiments of the present invention.

According to various embodiments of the present invention, the electronic device 400 may perform a mobile payment through the payment application 402. The payment application 402 may include a payment interface through which information about at least one payment means available for a mobile payment can be displayed. For example, in the payment interface, a card skin that includes an image representative of a payment means and information about a payment means may be displayed. Further, in the payment interface, a fingerprint recognition area for approval of payment, a help area for payment, and the like may be displayed. An exemplary image of the payment interface is shown in FIG. 5.

According to various embodiments of the present invention, the electronic device 400 may change at least one card skin displayed in the payment interface through the payment application 402. For example, the electronic device 400 may change the image representative of a payment means and display benefits of a payment means in the card skin.

Figure 9A:
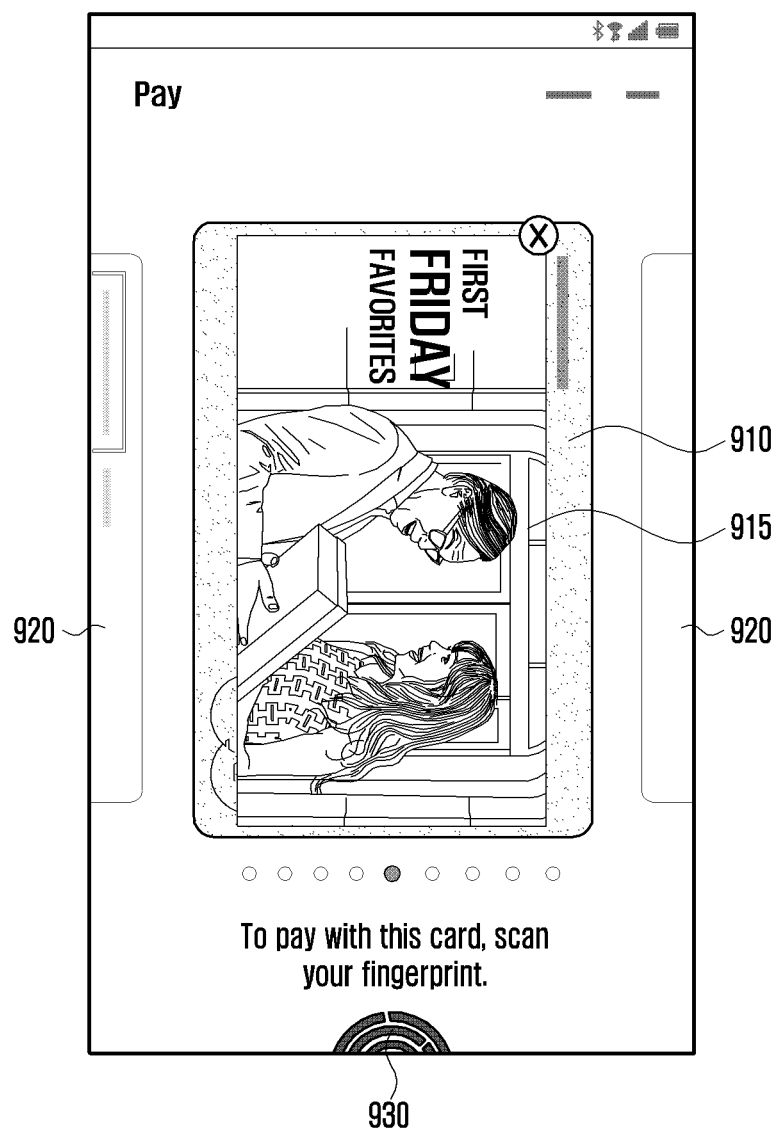
FIGS. 9A to 9C are diagrams illustrating a user interface capable of offering various kinds of information to a user by using a cover art of an electronic device according to various embodiments of the present invention.
Figure 9B:
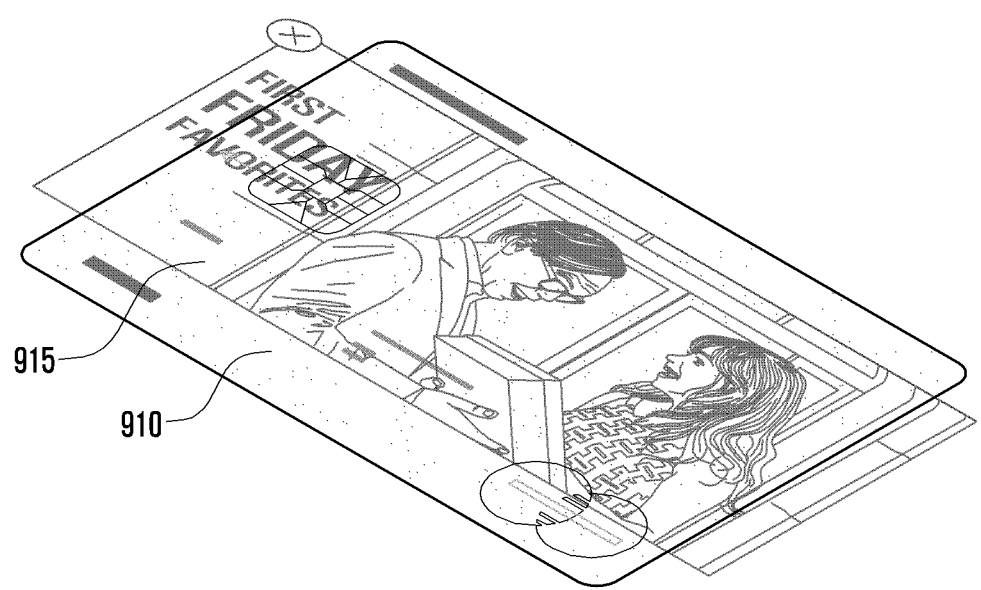
Figure 9C:
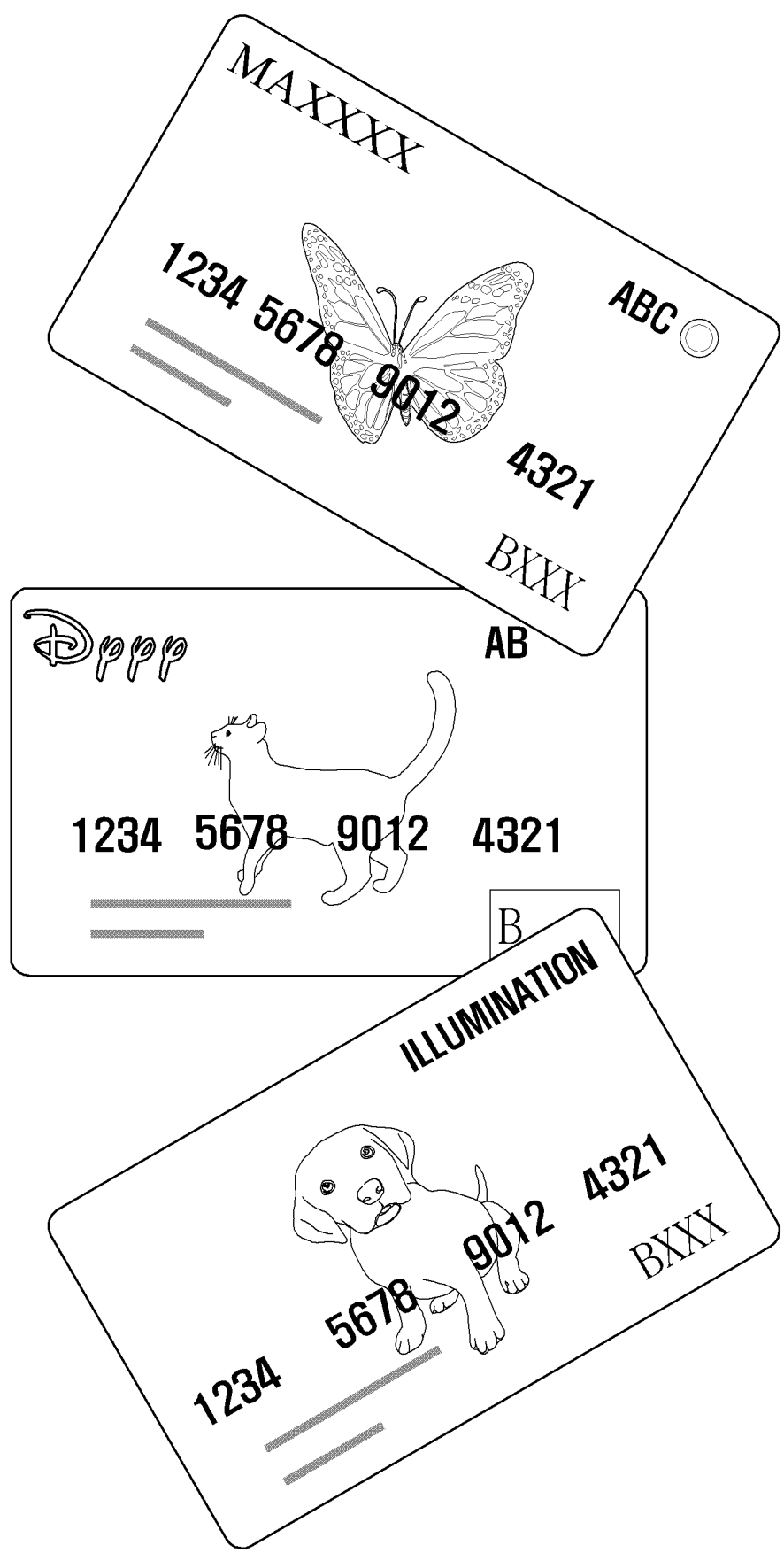

According to various embodiments of the present invention, the electronic device 400 may receive marketing information from the service server 410 or the card company server 420 and display the marketing information in the form of cover art together with the card skin. Exemplary images of the cover art are shown in FIGS. 9A to 9C.

According to various embodiments of the present invention, the electronic device 400 may acquire information necessary for payment approval through the sensor unit 404. For example, the sensor unit 404 may include a fingerprint recognition sensor and acquire fingerprint information of an authenticated user. Based on the acquired fingerprint information, the electronic device 400 may verify whether the corresponding payment means is approved.

According to various embodiments of the present invention, the electronic device 400 may transmit/receive location information thereof or payment information thereof through the communication unit 406. For example, the communication unit 406 may include the GPS module 227 and acquire the location information of the electronic device 400. Also, the communication unit 406 may communicate with an external device 600 or the service server 410 through at least one of the cellular module 221, the WiFi module 223, the BT module 225, and the NFC module 228, and thereby transmit/receive at least one kind of information required for a mobile payment.

According to various embodiments of the present invention, the electronic device 400 may change the disposition of at least one payment means displayed in the payment interface. The electronic device 400 may identify a place thereof through the communication unit 406, and dispose a suitable payment means for the identified place to make payment easier. For example, if the place where the electronic device 400 is located is a Shinsegae department store, the electronic device 400 may identify a payment means associated with the Shinsegae department store among at least one payment means stored in the payment application 402, and dispose the identified payment means in the center of the payment interface. Therefore, the user of the electronic device 400 needs not search for a suitable payment means, and a user's action for payment becomes easier.

FIG. 5 is a diagram illustrating a user interface for a mobile payment means of an electronic device according to various embodiments of the present invention.

Referring to FIG. 5, the electronic device 400 may perform a mobile payment function through the payment application 402. The payment application 402 may include a user interface (or a payment interface) to enhance the operability and intuitiveness of the user.

According to various embodiments of the present invention, a payment means 510 that can be used for payment may be displayed in the center of the user interface. For example, a Samsung Card 2 510 may be disposed in the center of the user interface to be used for payment. In this case, the payment means may be a credit card, and the name of the payment means may be Samsung Card 2. A card skin corresponding to the Samsung Card 2 is received from the service server 410 or the card company server 420 and may be the same as a real image of the payment means.

According to various embodiments of the present invention, the user of the electronic device 400 may place a finger in a fingerprint recognition area 530 to pay an article or service by using the centrally disposed payment means 510. Meanwhile, one or more payment means may be registered and displayed in the user interface, and other payment means 520 may be displayed at least partially on the left/right of the centrally disposed payment means 510.

An electronic device according to various embodiments may comprise a display; a memory; and a processor. The processor may be configured to: display an indication stored in the memory and corresponding to a payment means through the display; identify context information related to the electronic device; display first additional information related to the payment means in association with the indication through the display when the context information satisfies a first designated condition; and display second additional information related to the payment means in association with the indication through the display when the context information satisfies a second designated condition.

The electronic device may further comprise a communication interface, and the processor may be further configured to: activate an application related to the payment means; and acquire the first additional information or the second additional information from an external electronic device through the communication interface, based on the activation.

The processor may be further configured to identify payment information related to the payment means as at least part of the context information.

The processor may be further configured to identify, as at least part of the context information, a location of the electronic device, a time at which the indication is displayed, beacon information acquired from an external electronic device with respect to the electronic device, user preference information for the payment means, or a combination thereof.

The electronic device may further comprise a communication interface, and the processor may be further configured to: receive event information or promotion information related to the payment means from an external electronic device through the communication interface; and display the event information or the promotion information as at least part of the first or second additional information.

The processor may be further configured to change the first or second additional information, based on at least part of a shape of the indication, a type of the indication, a configuration of the indication, or a combination thereof, and display the changed first or second additional information through the display.

The processor may be further configured to display, through the display, the first or second additional information to be overlapped with the indication.

The processor may be further configured to display, through the display, the first or second additional information to be separated from and parallel with the indication.

The processor may be further configured to receive the payment information related to the payment means from an external electronic device.

The processor may be further configured to identify, as at least part of the user preference information, a usage history of the payment means, whether points are accumulated, whether a discount benefit is used, or a combination thereof.

An electronic device according to various embodiments may comprise a display; a communication module; a processor functionally connected to the display and the communication module; and a memory functionally connected to the processor. The memory may store instructions that cause, upon execution, the processor to: register at least one payment means through a payment application, receive a first image corresponding to the at least one payment means, and change the first image corresponding to the at least one payment means to a second image in response to at least one event.

The at least one payment means may include at least one of a credit card and a debit card.

The instructions may further cause the processor to receive the first image corresponding to the at least one payment means from a server that manages the at least one payment means.

The at least one event may include an event in which the electronic device performs short-range wireless communication with an external electronic device installed in a shop, and the instructions may further cause the processor to transmit information about the shop and information about the electronic device to a server managing the at least one payment means in response to the short-range wireless communication, to receive, from the server, the second image corresponding to the at least one payment means associated with the store, and to change the first image to the received second image.

The short-range wireless communication may include at least one of near field communication (NFC) or Bluetooth.

The at least one event may include an event of receiving a first user input for changing an image corresponding to the at least one payment means, and the instructions may further cause the processor to control the display to display a list having at least one benefit corresponding to the at least one payment means in response to the first user input, to receive a second user input for selecting the at least one benefit from the list, and to add the at least one benefit, selected in response to the second user input, to the first image to change the first image to the second image.

The at least one benefit may include at least one of a traffic discount, a communication discount, a beverage discount, a movie discount, or a point accumulation, which are provided by the at least one payment means.

The at least one event may include an event in which the electronic device receives a third image from a server managing the at least one payment means, and the instructions may further cause the processor to control the display to display the third image to be overlapped with the first image.

The third image may be an image including advertisement information.

The instructions may further cause the processor to adjust the transparency of the third image so that the first image is visible.

Figure 6A:
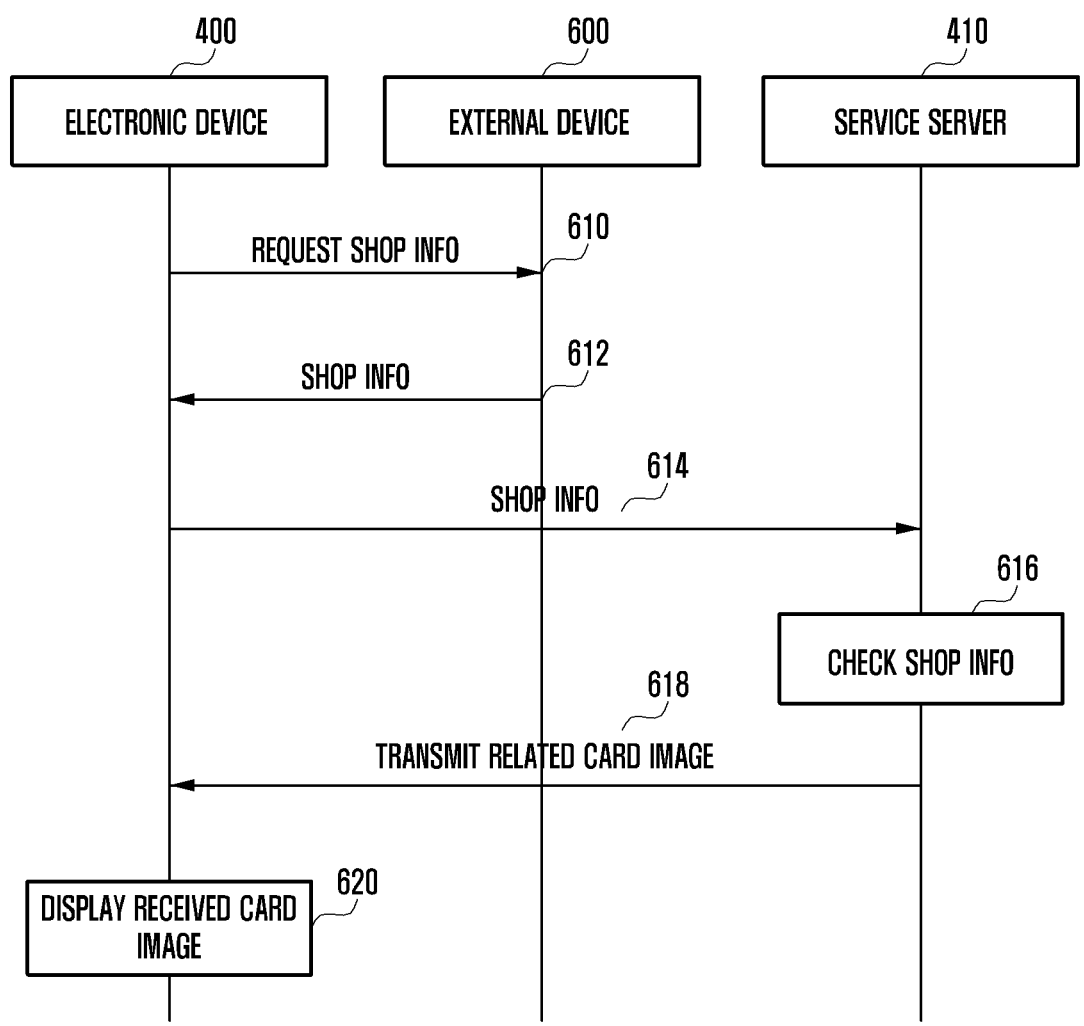
FIGS. 6A and 6B are flow diagrams illustrating a method for receiving an indication of a mobile payment means corresponding to shop information through an external device at an electronic device according to various embodiments of the present invention.
Figure 6B:
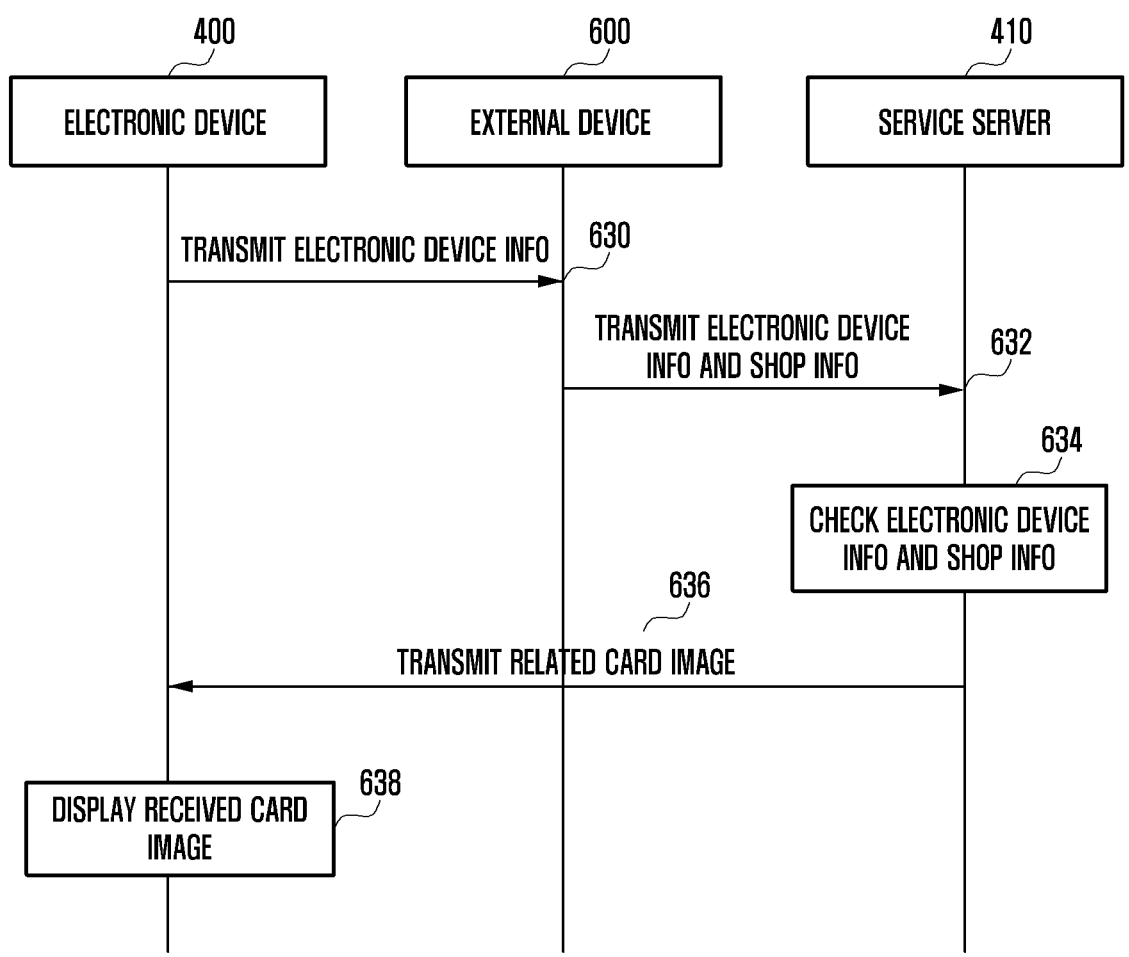

FIGS. 6A and 6B are flow diagrams illustrating a method for receiving an indication of a mobile payment means corresponding to shop information through an external device at an electronic device according to various embodiments of the present invention.

Referring to FIGS. 6A and 6B, in various embodiments of the present invention, the electronic device 400 (e.g., the processor 120 or 210) may recognize that it enters an affiliated shop of at least one payment means registered in the payment application 402. For example, using the GPS module 227, the electronic device 400 may recognize that it is located in the affiliated shop. In addition, through short-range wireless communication (e.g., tag, beacon, etc.) with the external device 600 installed in the affiliated shop, the electronic device 400 may recognize that it is located in the affiliated shop.

According to various embodiments of the present invention, the electronic device 400 (e.g., the processor 120 or 210) may change displaying a payment means associated with the affiliated shop among payment means registered in the payment application 402. For example, if the affiliated shop is the Shinsegae department store, the electronic device may search for a name of a registered payment means (e.g., Shinsegae Samsung Card 7) and then change a card skin of the payment means from an existing real card image to a certain image related to the Shinsegae department store (e.g., a logo of the department store). According to various embodiments, the electronic device 400 may change the disposition of a payment means associated with the affiliated shop to be located in the center of a payment interface. According to various embodiments, if there are two or more payment means associated with the affiliated shop, the electronic device 400 may select a specific payment means to be displayed centrally, based on a predetermined priority (e.g., a user's preference) or a predetermined condition (e.g., when a credit limit of a first payment means is exceeded, to display centrally a second payment means a credit limit of which is not exceeded).

Referring to FIGS. 6A and 6B, in various embodiments, the electronic device 400 may receive an image (e.g., a card skin) of a payment means from the service server 410 through short-range wireless communication (e.g., tag, beacon, etc.) with the external device 600.

Referring to FIG. 6A, in various embodiments of the present invention, the electronic device 400 (e.g., the processor 120 or 210) may communicate with the external device 600 through short-range wireless communication at operations 610 and 620. Specifically, the electronic device 400 may request the external device 600 to offer shop information at operation 610, and then receive the shop information from the external device 600 at operation 620.

According to various embodiments of the present invention, the electronic device 400 (e.g., the processor 120 or 210) may transmit at operation 614 the shop information, received from the external device 600, to the service server 410. Then, at operation 616, the service server 410 may check the received shop information and retrieve payment means information associated with the shop information.

According to various embodiments of the present invention, the electronic device 400 (e.g., the processor 120 or 210) may receive the payment means information (e.g., including a card skin of a payment means) from the service server 410 at operation 618.

According to various embodiments of the present invention, the electronic device 400 (e.g., the processor 120 or 210) may display the receive payment means information (e.g., including a card skin of a payment means) in the payment interface at operation 620. Of course, among pieces of the received payment means information, a certain piece of information that does not match the payment means previously registered in the electronic device 400 may not be displayed. Through this process, the electronic device 400 can immediately provide the user with information about the payment means associated with a currently located place, and the user can pay a desired article or service more easily.

Referring to FIG. 6B, in various embodiments of the present invention, the electronic device 400 (e.g., the processor 120 or 210) may communicate with the external device 600 through short-range wireless communication at operation 630. Specifically, at operation 630, the electronic device 400 may transmit information about the electronic device 400 (e.g., including information about a payment application and a payment means) to the external device 600.

According to various embodiments of the present invention, the external device 600 may transmit the receive information about the electronic device 400 and shop information to the service server 410 at operation 632.

According to various embodiments of the present invention, the service server 410 may check the receive information about the electronic device 400 and the received shop information at operation 634. For example, the service server 410 may identify the payment means associated with the shop information in the information about the electronic device 400.

According to various embodiments of the present invention, the electronic device 400 (e.g., the processor 120 or 210) may receive information about the payment means (e.g., including a card skin of the payment means) associated with the shop information from the service server 410 at operation 636.

According to various embodiments of the present invention, the electronic device 400 (e.g., the processor 120 or 210) may display the received payment means information (e.g., including a card skin of the payment means) in the payment interface at operation 638. Through this process, the electronic device 400 can immediately provide the user with information about the payment means associated with a currently located place, and the user can pay a desired article or service more easily.

Figure 7A:
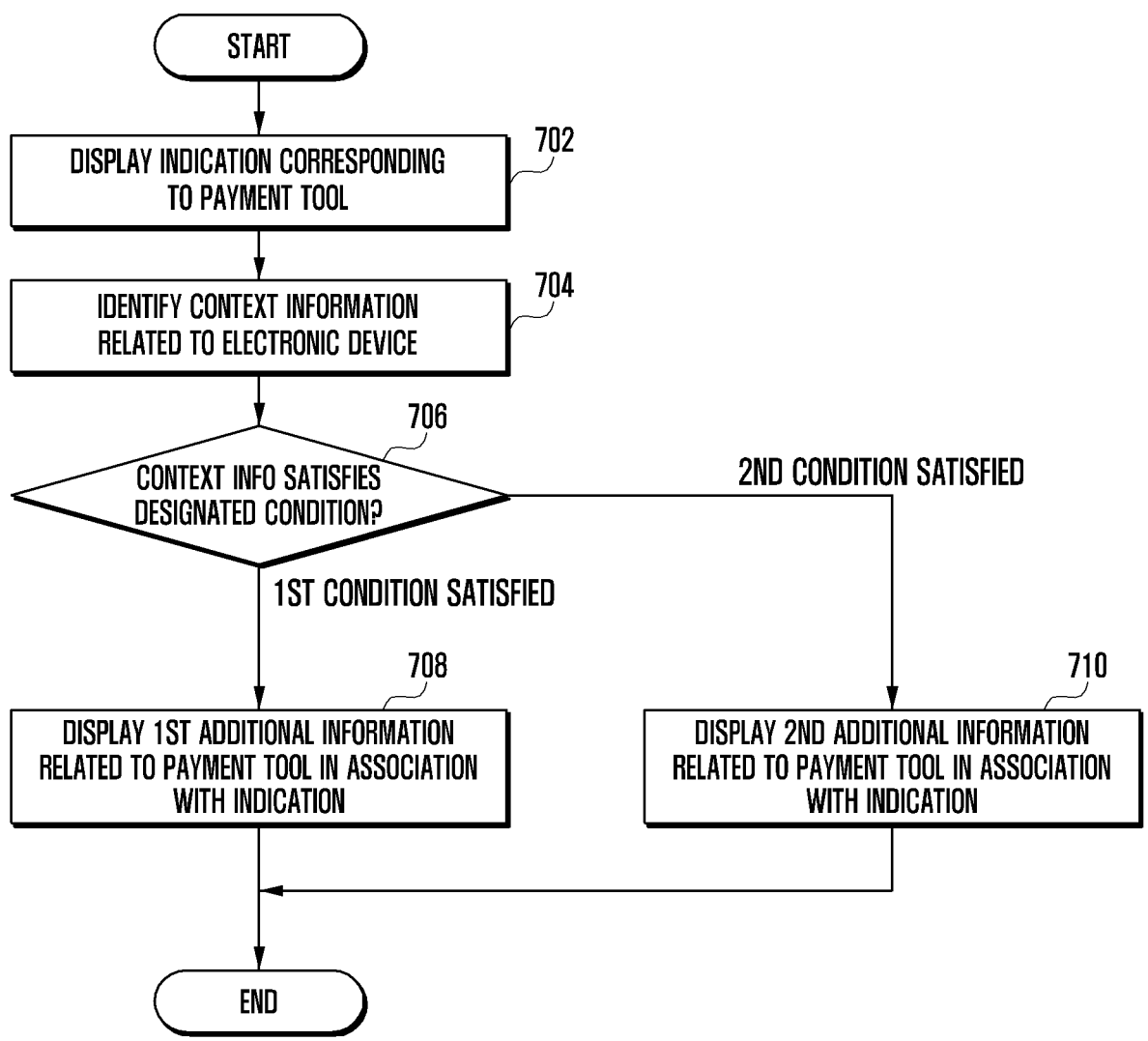
FIG. 7A is a flow diagram illustrating a method for displaying additional information associated with an indication corresponding to a payment means of an electronic device according to various embodiments of the present invention.

FIG. 7A is a flow diagram illustrating a method for displaying additional information associated with an indication corresponding to a payment means of an electronic device according to various embodiments of the present invention.

Referring to FIG. 7A, in various embodiments of the present invention, the electronic device 400 (e.g., the processor 120 or 210) may display an indication (e.g., a card image, a card skin, a cover art, etc.) corresponding to a payment means at operation 702.

Referring to FIG. 7A, in various embodiments of the present invention, the electronic device 400 (e.g., the processor 120 or 210) may identify context information related to the electronic device at operation 704.

According to various embodiments, the electronic device 400 may identify, as at least part of the context information, payment information related to the payment means.

According to various embodiments, the electronic device 400 may receive payment information related to the payment means from an external electronic device.

According to various embodiments, the electronic device 400 may identify, as at least part of the context information, a location of the electronic device, a time at which the indication is displayed, beacon information acquired from an external electronic device with respect to the electronic device, user preference information for the payment means, or a combination thereof.

According to various embodiments, the electronic device 400 may identify, as at least part of the user preference information, a usage history of the payment means, whether points are accumulated, whether a discount benefit is used, or a combination thereof.

Referring to FIG. 7A, in various embodiments of the present invention, the electronic device 400 (e.g., the processor 120 or 210) may determine at operation 706 whether the context information identified at operation 704 satisfies a designated condition. According to various embodiments, the electronic device 400 may perform operation 708 when the context information satisfies a first condition. According to various embodiments, the electronic device 400 may perform operation 710 when the context information satisfies a second condition.

Referring to FIG. 7A, in various embodiments of the present invention, the electronic device 400 (e.g., the processor 120 or 210) may display at operation 708 first additional information related to the payment means in association with the indication displayed at operation 702.

According to various embodiments, the electronic device 400 may activate an application related to the payment means, and acquire the first additional information from the external electronic device by using the activated application.

According to various embodiments, the electronic device 400 may receive event information or promotion information related to the payment means from the external electronic device, and display the received event information or promotion information as the first additional information.

According to various embodiments, the electronic device 400 may change the first additional information, based on at least part of a shape of the indication, a type of the indication, a configuration of the indication, or a combination thereof, and display the changed first additional information.

According to various embodiments, the electronic device 400 may display the first additional information to be overlapped with the indication.

According to various embodiments, the electronic device 400 may display the first additional information to be separated from and parallel with the indication.

Referring to FIG. 7A, in various embodiments of the present invention, the electronic device 400 (e.g., the processor 120 or 210) may display at operation 710 second additional information related to the payment means in association with the indication displayed at operation 702.

According to various embodiments, the electronic device 400 may activate an application related to the payment means, and acquire the second additional information from the external electronic device by using the activated application.

According to various embodiments, the electronic device 400 may receive event information or promotion information related to the payment means from the external electronic device, and display the received event information or promotion information as the second additional information.

According to various embodiments, the electronic device 400 may change the second additional information, based on at least part of a shape of the indication, a type of the indication, a configuration of the indication, or a combination thereof, and display the changed second additional information.

According to various embodiments, the electronic device 400 may display the second additional information to be overlapped with the indication.

According to various embodiments, the electronic device 400 may display the second additional information to be separated from and parallel with the indication.

Figure 7B:
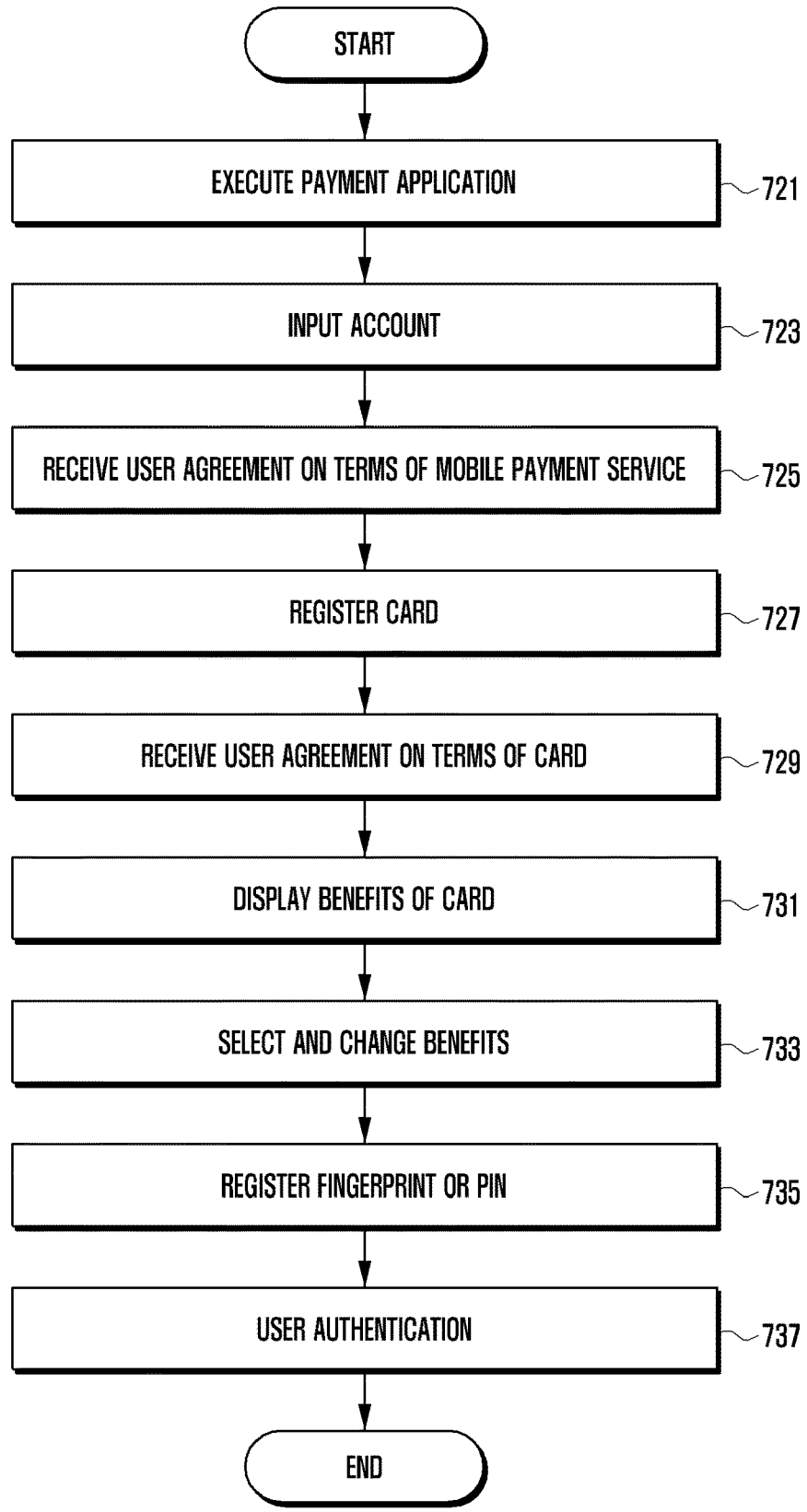
FIG. 7B is a flow diagram illustrating a method for registering a mobile payment means of an electronic device according to various embodiments of the present invention.

FIG. 7B is a flow diagram illustrating a method for registering a mobile payment means of an electronic device according to various embodiments of the present invention.

Referring to FIG. 7B, in various embodiments of the present invention, the electronic device 400 (e.g., the processor 120 or 210) may execute a payment application at operation 721. For example, the payment application is for performing a mobile payment service, and may include the Samsung Pay application or any other mobile payment application.

According to various embodiments of the present invention, the electronic device 400 (e.g., the processor 120 or 210) may input an account of the payment application at operation 723. For example, the electronic device 400 may receive, from the user, a user's unique identifier and a corresponding password.

According to various embodiments of the present invention, the electronic device 400 (e.g., the processor 120 or 210) may receive a user's agreement on the terms of a mobile payment service at operation 725.

According to various embodiments of the present invention, the electronic device 400 (e.g., the processor 120 or 210) may register at least one payment means, which a user wishes to register, in the payment application at operation 727. For example, the electronic device 400 may register the Samsung Card 2 in the Samsung Pay application at a user's request.

According to various embodiments of the present invention, the electronic device 400 (e.g., the processor 120 or 210) may receive a user's agreement on the terms of the registered payment means at operation 729. For example, the electronic device 400 may receive a user's agreement on the terms of the registered Samsung Card 2.

Figure 8:
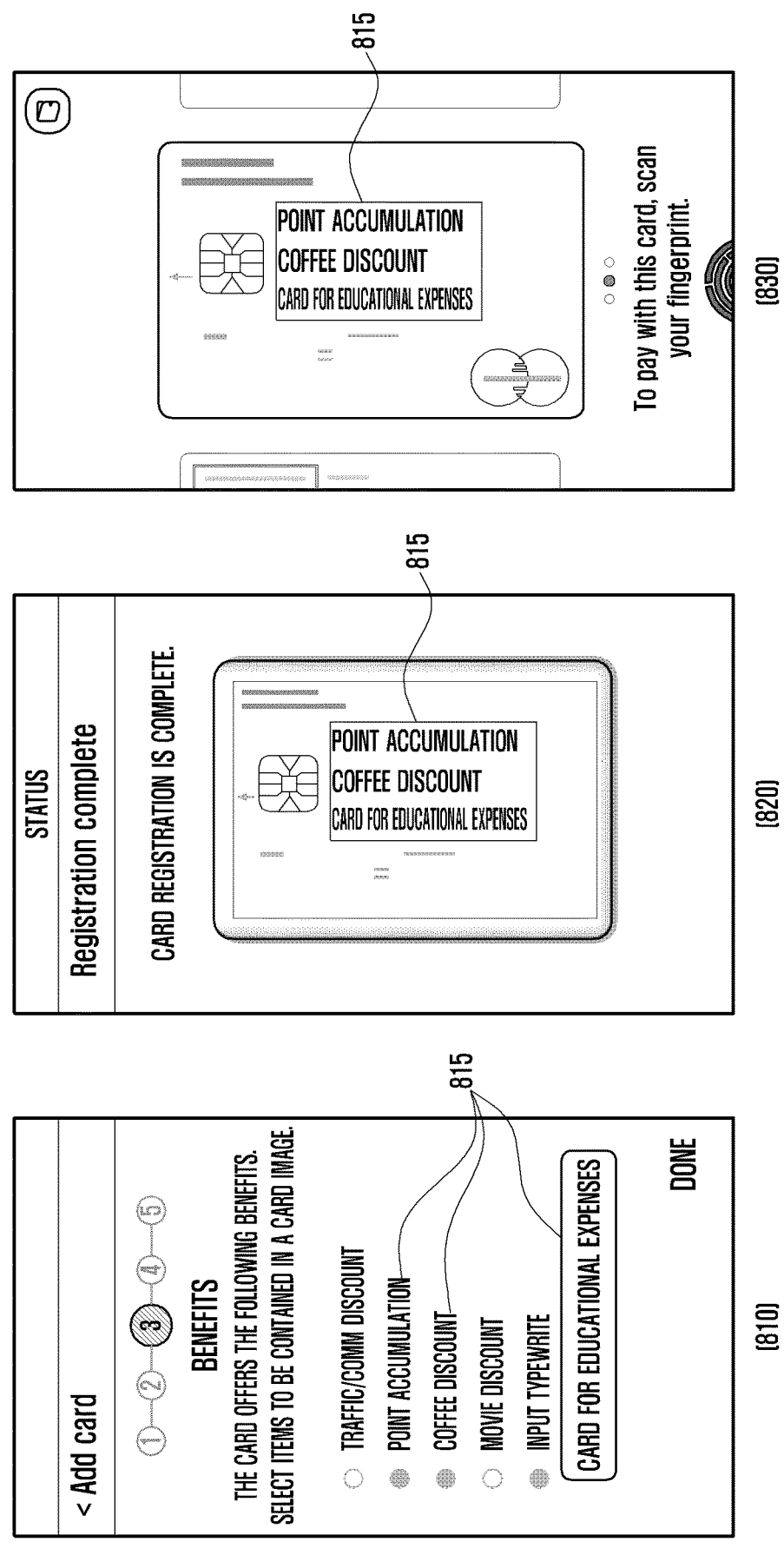
FIG. 8 is a diagram illustrating a user interface capable of displaying benefits of a mobile payment means of an electronic device according to various embodiments of the present invention.

According to various embodiments of the present invention, the electronic device 400 (e.g., the processor 120 or 210) may display at least one benefit of the registered payment means at operation 731. For example, the electronic device 400 may display a list of benefits of the Samsung Card 2. An exemplary list is shown in FIG. 8.

According to various embodiments of the present invention, the electronic device 400 (e.g., the processor 120 or 210) may receive a user's input for selecting or changing at least one benefit to be displayed on a card skin at operation 733. The electronic device 400 may display the benefits selected by the user on the card skin rather than unchangeably display the card skin received from the card company server 420. Therefore, the user needs not search for the benefits of the payment means every time. In addition, because the benefits of the payment means are intuitively displayed, the user can use the payment service more easily.

According to various embodiments of the present invention, the electronic device 400 (e.g., the processor 120 or 210) may register, at operation 735, a user's fingerprint or personal identification number (PIN) required for approval of the payment means. Using the registered fingerprint or PIN, the electronic device 400 may verify the payment of an article or service that the user intends to purchase.

According to various embodiments of the present invention, the electronic device 400 (e.g., the processor 120 or 210) may authenticate, at operation 737, that the above operations are performed by the user of electronic device 400. That is, through the user authentication, the electronic device 400 may finally register the above information (account, payment means, fingerprint, PIN, etc.) regarding the mobile payment service.

An electronic device according to various embodiments may perform operations of displaying an indication corresponding to a payment means; identifying context information related to the electronic device; displaying first additional information related to the payment means in association with the indication when the context information satisfies a first designated condition; and displaying second additional information related to the payment means in association with the indication when the context information satisfies a second designated condition.

The electronic device may further perform operations of activating an application related to the payment means; and acquiring the first additional information or the second additional information from an external electronic device, based on the activation.

The electronic device may further perform operation of identifying payment information related to the payment means as at least part of the context information.

The electronic device may further perform operation of identifying, as at least part of the context information, a location of the electronic device, a time at which the indication is displayed, beacon information acquired from an external electronic device with respect to the electronic device, user preference information for the payment means, or a combination thereof.

The electronic device may further perform operations of receiving event information or promotion information related to the payment means from an external electronic device; and displaying the event information or the promotion information as at least part of the first or second additional information.

An electronic device according to various embodiments may perform operations of registering at least one payment means through a payment application; receiving a first image corresponding to the at least one payment means; and changing the first image corresponding to the at least one payment means to a second image in response to at least one event.

The at least one payment means may include at least one of a credit card and a debit card.

The electronic device may further perform operation of receiving the first image corresponding to the at least one payment means from a server that manages the at least one payment means.

The at least one event may include an event in which the electronic device performs short-range wireless communication with an external electronic device installed in a shop, and the electronic device may further perform operations of transmitting information about the shop and information about the electronic device to a server managing the at least one payment means in response to the short-range wireless communication; receiving, from the server, the second image corresponding to the at least one payment means associated with the store; and changing the first image to the received second image.

The short-range wireless communication may include at least one of near field communication (NFC) or Bluetooth.

The at least one event may include an event of receiving a first user input for changing an image corresponding to the at least one payment means, and the electronic device may further perform operations of displaying a list having at least one benefit corresponding to the at least one payment means in response to the first user input; receiving a second user input for selecting the at least one benefit from the list; and adding the at least one benefit, selected in response to the second user input, to the first image to change the first image to the second image.

The at least one benefit may include at least one of a traffic discount, a communication discount, a beverage discount, a movie discount, or a point accumulation, which are provided by the at least one payment means.

The at least one event may include an event in which the electronic device receives a third image from a server managing the at least one payment means, and the electronic device may further perform operation of displaying the third image to be overlapped with the first image.

The third image may be an image including advertisement information.

The transparency of the third image may be adjusted so that the first image is visible.

FIG. 8 is a diagram illustrating a user interface capable of displaying benefits of a mobile payment means of an electronic device according to various embodiments of the present invention.

Referring to FIG. 8, in various embodiments of the present invention, the electronic device 400 may display a screen according to the operations 760 to 770 of FIG. 7 as shown in screenshot 810. For example, a payment means (e.g., a card) that a user wishes to register may provide benefits such as a traffic/communication discount, a point accumulation, a coffee discount, a movie discount, and the like. The electronic device 400 may receive the above benefits from the service server 410 or the card company server 420, and may display, as a list, at least one benefit in the card registration process. In addition to such benefits received from the service server 410 or the card company server 420, the electronic device 400 may display an item allowing a user's direct input (e.g., typewritten input).

According to various embodiments of the present invention, as shown in screenshots 820 and 830, the electronic device 400 may display at least one item 815 selected by the user on a card skin. The electronic device 400 may display the benefits selected by the user on the card skin rather than unchangeably display the card skin received from the card company server 420. Therefore, the user needs not search for the benefits of the payment means every time. In addition, because the benefits of the payment means are intuitively displayed, the user can use the payment service more easily.

FIGS. 9A to 9C are diagrams illustrating a user interface capable of offering various kinds of information to a user by using a cover art of an electronic device according to various embodiments of the present invention.

Referring to FIG. 9A, in various embodiments of the present invention, the electronic device 400 may display one or more card skins 910 and 920 and a fingerprint recognition area 930 in the payment interface. Also, the electronic device 400 may display a cover art 915 together with the card skin 910 disposed centrally. The cover art 915 may be provided by the user, the service server 410, or the card company server 420, and may be overlapped with the card skin.

Referring to FIG. 9A, in various embodiments of the present invention, the cover art 915 of the electronic device 400 may be advertisement information provided by the service server 410 or the card company server 420. The electronic device 400 may receive the type of cover art 915, exposure conditions, the number of exposures, the exposure time, etc. from the service server 410 or the card company server 420, and then expose the cover art 915 together with the card skin 910 in the payment interface.

Referring to FIG. 9B, in various embodiments of the present invention, the electronic device 400 may adjust the size of the cover art 915 to be smaller than the size of the card skin 910 such that essential information of the card skin 910 disposed centrally in the payment interface is visible.

Referring to FIG. 9B, in various embodiments of the present invention, the electronic device 400 may adjust the transparency of the cover art 915 such that essential information of the card skin 910 disposed centrally in the payment interface is visible. For example, the user of the electronic device 400 may adjust the transparency of the cover art 915 to see the card skin 910 underlying the cover art 915.

Referring to FIG. 9B, in various embodiments of the present invention, the electronic device 400 may display a specific spot for terminating the cover art 915. For example, an X-shaped spot may be displayed near the upper right corner of the cover art 915.

Referring to FIG. 9C, in various embodiments of the present invention, the cover art 915 of the electronic device 400 may be information that is selectively displayed by the user. The card skin 910 of the electronic device 400 may no longer provide a card image in accordance with a card company's policy. For example, when the card company adopts a demarketing policy for a certain card, the card skin of the card may display only a card company name without its own image. In this case, it may be difficult to distinguish the card skin from other card skins. According to various embodiments of the present invention, the user of the electronic device 400 may directly produce the cover art 915 to be displayed in association with the card skin 910. Also, the user of the electronic device 400 may receive the cover art 915 produced by another user from the service server 410 and then set the received cover art to be displayed in association with the card skin 910. In this way, the user may set respective payment means to be easily distinguished from each other.

The term "module" used herein may refer to a unit that includes one or a combination of two or more of, for example, hardware, software or firmware. The "module" may be interchangeably used with terms such as, for example, unit, logic, logical block, component, or circuit.

The "module" may be a minimum unit, or a part thereof, of an integrally constructed component. The "module" may be a minimum unit, or a part thereof, that performs one or more functions. The "module" may be implemented either mechanically or electronically. For example, the "module" may include at least one of an application-specific integrated circuit (ASIC) chip, a field-programmable gate array (FPGA), or a programmable-logic device, which is well known or to be developed to perform particular operations.

According to various embodiments, at least a part of the device (e.g., modules or functions thereof) or the method (e.g., operations) may be implemented, for example, as instructions stored in a non-transitory computer-readable storage medium in a programming module form. When the instructions are executed by a processor (e.g., the processor 120), the processor may execute a function corresponding to the instructions. The computer-readable storage medium may be, for example, the memory 130.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The hardware devices described above may be configured to operate as one or more software modules to perform the operations of the various embodiments, and vice versa.

According to various embodiments, a storage medium may store instructions, which cause, upon execution, at least one processor to display an indication corresponding to a payment means; to identify context information related to the electronic device; to display first additional information related to the payment means in association with the indication when the context information satisfies a first designated condition; and to display second additional information related to the payment means in association with the indication when the context information satisfies a second designated condition.

According to various embodiments, a storage medium may store instructions, which cause, upon execution, at least one processor to register at least one payment means through a payment application; to receive a first image corresponding to the at least one payment means; and to change the first image corresponding to the at least one payment means to a second image in response to at least one event.

Modules or programming modules according to the embodiments of the present invention may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although exemplary embodiments of the invention have been described in detail above, it should be understood that many variations and modifications of the basic inventive concept herein described, which may be apparent to those skilled in the art, will still fall within the spirit and scope of the exemplary embodiments of the invention as defined in the appended claims.

The invention claimed is:

1. An electronic device comprising:
a display;
a communication interface;
a memory; and
a processor configured to:
receive a first card image corresponding to payment means stored in the memory, from an external electronic device through the communication interface,
receive information to be displayed on the first card image based on user input,
display an indication including the first card image and the information corresponding to the payment means through the display,
receive at least one event for changing the first card image corresponding to the indication to a second card image corresponding to the indication, the at least one event includes an event in which the electronic device performs short-range wireless communication with the external electronic device installed in a shop,
transmit information about the shop and information about the electronic device to a server managing the payment means in response to the short-range wireless communication,
receive the second card image corresponding to the payment means from the server, the second card image corresponding to the payment means associated with the shop and is different than the first card image,
change, in response to the at least one event, the first card image to the received second card image,
display the second card image on the first card image by adjusting a transparency of the second card image as the indication,
identify payment information related to the payment means as at least part of context information related to the electronic device,
display first additional information related to the payment means in association with the indication through the display when the context information satisfies a first designated condition, and
display second additional information related to the payment means in association with the indication through the display when the context information satisfies a second designated condition,
wherein the first card image corresponds to a real image of the payment means.

2. The electronic device of claim 1, wherein the processor is further configured to:
activate an application related to the payment means, and
acquire the first additional information or the second additional information from the external electronic device through the communication interface, based on the activation.

3. The electronic device of claim 1, wherein the processor is further configured to identify, as at least part of the context information, a location of the electronic device, a time at which the indication is displayed, beacon information acquired from the external electronic device with respect to the electronic device, user preference information for the payment means, or a combination thereof.

4. The electronic device of claim 3, wherein the processor is further configured to identify, as at least part of the user preference information, a usage history of the payment means, whether points are accumulated, whether a discount benefit is used, or a combination thereof.

5. The electronic device of claim 1, wherein the processor is further configured to:
- receive event information or promotion information related to the payment means from the external electronic device through the communication interface, and
- display the event information or the promotion information as at least part of the first or second additional information.

6. The electronic device of claim 1, wherein the processor is further configured to:
- change the first or second additional information, based on the indication, and
- display the changed first or second additional information through the display.

7. The electronic device of claim 1, wherein the processor is further configured to display, through the display, the first or second additional information to be overlapped with the indication.

8. The electronic device of claim 1, wherein the processor is further configured to display, through the display, the first or second additional information separated from the indication.

9. The electronic device of claim 1, wherein the processor is further configured to receive the payment information related to the payment means from the external electronic device.

10. The electronic device of claim 1,
- wherein the at least one event includes an event in which the electronic device receives a third card image from a server managing the payment means, and
- wherein the processor is further configured to display the third card image to be overlapped with the first card image.

11. The electronic device of claim 1, wherein the processor is further configured to:
- produce a second card image, by a user, to be displayed in association with the first card image.

12. A method of an electronic device, the method comprising:
- receiving a first card image corresponding to payment means stored in a memory of the electronic device, from an external electronic device through a communication interface of the electronic device;
- receiving information to be displayed on first card image based on user input;
- displaying an indication including the first card image and the information corresponding to a payment means;
- receiving at least one event for changing the first card image corresponding to the indication to a second card image corresponding to the indication, the at least one event includes an event in which the electronic device performs short-range wireless communication with the external electronic device installed in a shop;
- transmitting information about the shop and information about the electronic device to a server managing the payment means in response to the short-range wireless communication;
- receiving the second card image corresponding to the payment means from the server, the second card image corresponding to the payment means associated with the shop and is different than the first card image;
- changing, in response to the at least one event, the first card image to the received second card image;
- displaying the second card image on the first card image by adjusting a transparency of the second card image as the indication;
- identifying payment information related to the payment means as at least part of context information related to the electronic device;
- displaying first additional information related to the payment means in association with the indication when the context information satisfies a first designated condition; and
- displaying second additional information related to the payment means in association with the indication when the context information satisfies a second designated condition,
- wherein the first card image corresponds to a real image of the payment means.

* * * * *